W. F. WHITNEY.
Wagon-Spring.

No. 169,323.  Patented Oct. 26, 1875.

UNITED STATES PATENT OFFICE.

WILLIAM F. WHITNEY, OF POUGHKEEPSIE, NEW YORK, ASSIGNOR OF ONE-HALF HIS RIGHT TO EDWARD STORMS, OF SAME PLACE.

IMPROVEMENT IN WAGON-SPRINGS.

Specification forming part of Letters Patent No. 169,323, dated October 26, 1875; application filed July 24, 1875.

*To all whom it may concern:*

Be it known that I, WILLIAM F. WHITNEY, of Poughkeepsie, in the county of Dutchess and State of New York, have invented certain Improvements in Springs for Vehicles; and I do hereby declare that the following is a full, clear, and exact description of the same, reference being had to the accompanying drawing, which forms part of this specification.

My invention relates to certain improvements in springs for vehicles operating on the torsion principle; and it consists in a novel arrangement and combination, whereby the application of torsion-springs to a side-bar wagon is accomplished in a simple and economical manner, and a strong and durable vehicle is produced.

Figure 1:
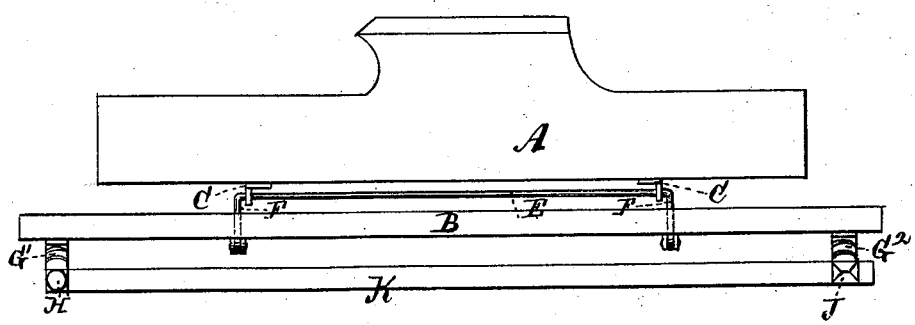
Figure 2:
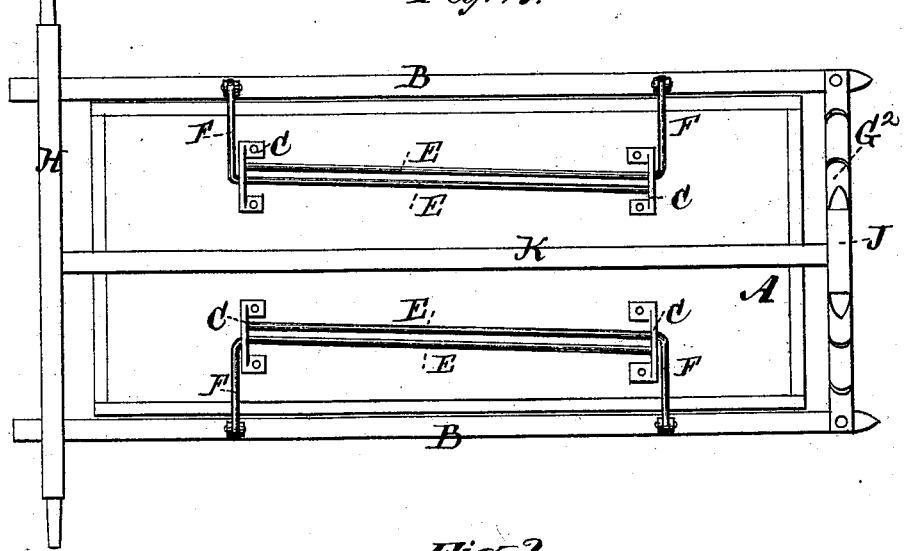
Figure 3:
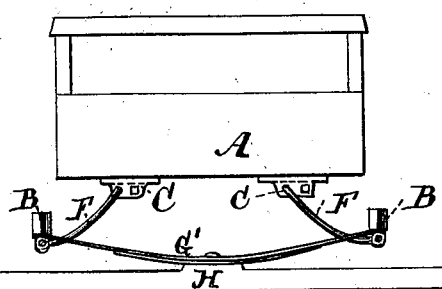

In the accompanying drawing, Figure 1 is a side view of a wagon embodying my invention. Fig. 2 is a bottom view of the same. Fig. 3 is an end view.

A represents the body of a vehicle of the description known as a "side-bar wagon," and B B represent the side bars. C is a metallic bracket, having perforated lugs at its ends for securing it to the under side of the body A by means of screws. About midway of the length of the bracket are two holes, one of which is round, and the other square. The square hole is for the reception of a square tenon on one end of a rod, E, and the round hole for the reception of the round portion of a similar rod. Four of these brackets are attached to the bottom of the body A, two near the front end, and two near the rear end, in parallel directions transversely to the length of the body. The rods E are made of elastic steel, and serve as springs by operating on the torsion principle. They are applied to the brackets by inserting the square tenon in the square hole of one bracket, while the round portion of the rod, near the opposite end, passes through, and works freely in, the round hole in the opposite bracket, projecting slightly beyond the same. Two of the rods are applied to the brackets on one side of the body, and two more to those on the other side. The rods are so arranged that the square tenon of one rod engages with the square socket in the bracket toward the front end of the body, and the square tenon of the other rod engages with the square socket of the bracket toward the rear end, so that the projecting ends of the rods of each pair are toward opposite ends of the body. The projecting round portions of the rods outside of the brackets are bent outward at about right angles with the length, so as to form arms F. The ends of these arms are attached to the side bars B, in any suitable manner. They are shown herein as attached by means of a pin-joint, $f$; but they may be attached by means of links, or by arranging the ends of the arms to slide in sockets attached to the side bars. The ends of the side bars B are connected by flat or semi-elliptical springs $G^1$ $G^2$, the rear spring $G^1$ being attached directly to the rear axle H, and the front spring $G^2$ having the bolster J attached to it.

The ends of the springs $G^1$ $G^2$ are shown herein as rigidly attached to the bars B B; but they may be attached by means of hinges or links, or in any other manner which will allow the bars to rock when the body A rises and falls.

As shown herein, the brackets C are narrow, and the attachment of the rods E is close to the bottom of the body A, so that when in its normal position the bottom of the body is on a higher level than that of the point of attachment of the ends of the arms F to the side bars B; but the brackets C may be of such width as to extend downward sufficiently far to place the body A in its normal position on a lower level than that of the bars B, in which case the arms F will be inclined upward from the brackets instead of downward, as shown herein.

The rear axle H and bolster J may be connected by a reach, K. One or more of the rods E may be used on each side.

By the arrangement and combination above described the torsion-springs are applied to a side-bar wagon in a simple and economical manner, and a strong and durable vehicle is obtained.

What I claim as new, and desire to secure by Letters Patent, is—

The combination, substantially as described, of the torsional springs F, secured at one end to the body of the carriage, the rectangular frame B, to which they are secured at the other ends, the flexile springs G', secured to said frame, and the axles H, the whole forming a combined torsional and flexile spring, substantially as herein set forth.

WM. F. WHITNEY.

Witnesses:
TRISTRAM COFFIN,
W. FARRINGTON.